A. BÜCHI.
AIR STARTING GEAR FOR COMBUSTION ENGINES.
APPLICATION FILED APR. 15, 1912.

1,258,864.

Patented Mar. 12, 1918.
3 SHEETS—SHEET 1.

UNITED STATES PATENT OFFICE.

ALFRED BÜCHI, OF WINTERTHUR, SWITZERLAND, ASSIGNOR TO BUSCH-SULZER BROS.-DIESEL ENGINE COMPANY, OF ST. LOUIS, MISSOURI, A CORPORATION OF MISSOURI.

AIR STARTING-GEAR FOR COMBUSTION-ENGINES.

1,258,864.

Specification of Letters Patent.

Patented Mar. 12, 1918.

Application filed April 15, 1912. Serial No. 691,059.

*To all whom it may concern:*

Be it known that I, ALFRED BÜCHI, a citizen of the Republic of Switzerland, residing at Winterthur, Canton of Zurich, Switzerland, have invented the following-described new and useful Improvements in Air Starting-Gears for Combustion-Engines.

The invention is an improvement in starting combustion engines by means of a pressure medium such as compressed air, and the improvement consists in the means and method of admitting and controlling such medium whereby, as the engine mass accelerates, the admission thereof may be reduced and the normal engine compression gradually restored, thereby causing the cylinder walls and the combustion air therein to attain a sufficient temperature, by such compression, to insure proper initial ignition of the fuel. The invention also involves independent features of valve and engine control and of the construction and arrangement of the parts thereof, as will hereinafter more fully appear.

The drawings forming part of this application illustrate in diagrammatic manner the preferred mode of operation of the present invention, Figure 1 being a diagram of the functions of the apparatus in starting an engine;

Fig. 2 a top plan view of a type of valve-gearing for performing such function;

Figs. 3 and 4 elevation views partly in section, of the valve-levers and cams shown in Fig. 2, and representing the same in one position of control.

Figure 1:
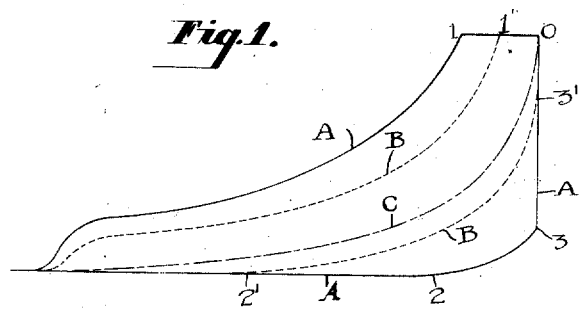
Figure 2:
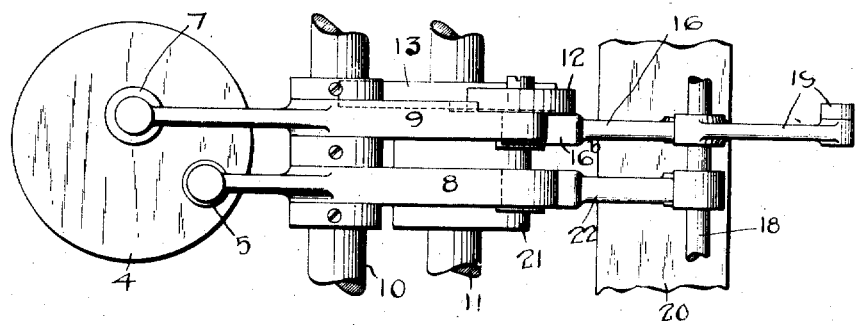

In Fig. 1, diagram A, in full lines, represents a maximum admission of starting air from 0 to 1, with corresponding expansion followed by a low or negligible compression from 2 to 3. Diagram B, in dotted lines, represents a lower degree of starting air admission from 0 to 1', with corresponding expansion followed by a relatively higher compression from 2' to 3'. Diagram C, in dot and dash lines, represents a starting air admission of zero and a normal compression. These three diagrams, A, B and C, represent successive effects of the operation of the present invention in starting an engine, whereby the compression, at first relieved, is gradually restored to attain the desired temperature for ignition, simultaneously with a reduction of the air admission.

Figure 3:
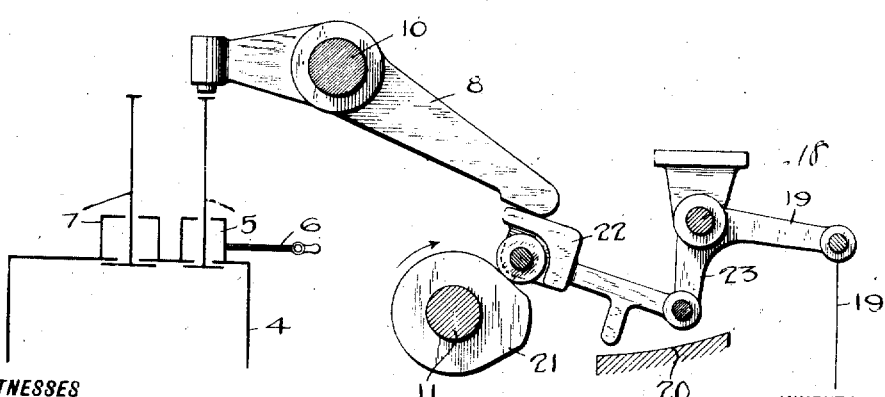
Figure 4:
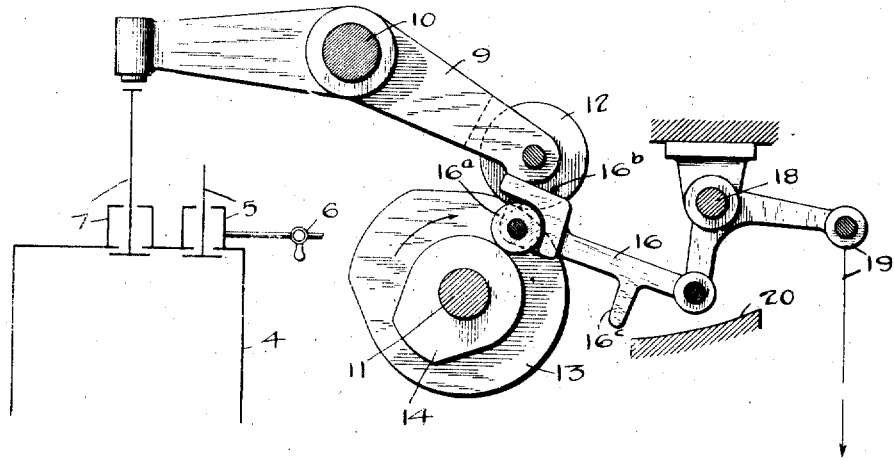
Figure 5:
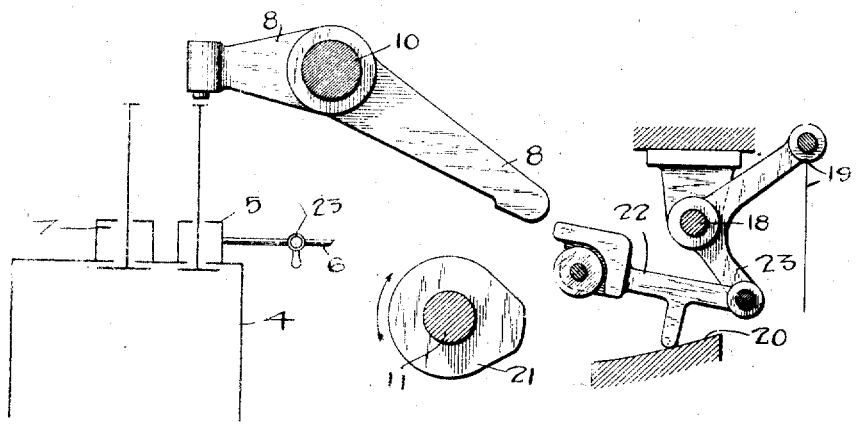
Figs. 5 and 6 represent the same elements in a further position of control.
Figure 6:
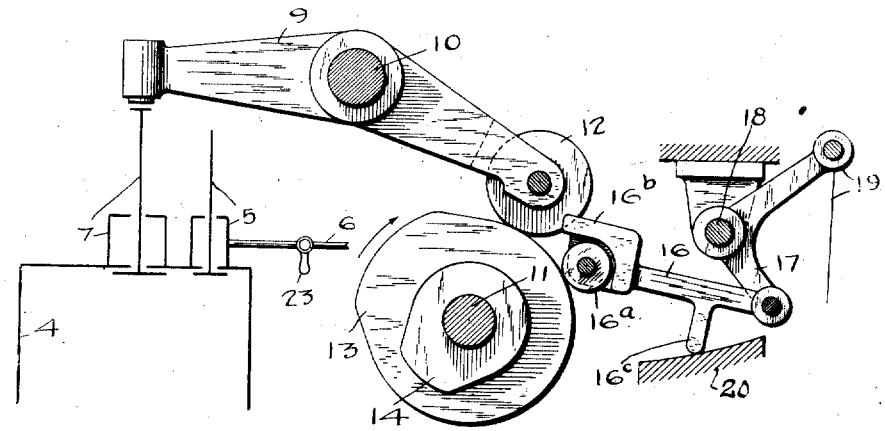
Figure 7:
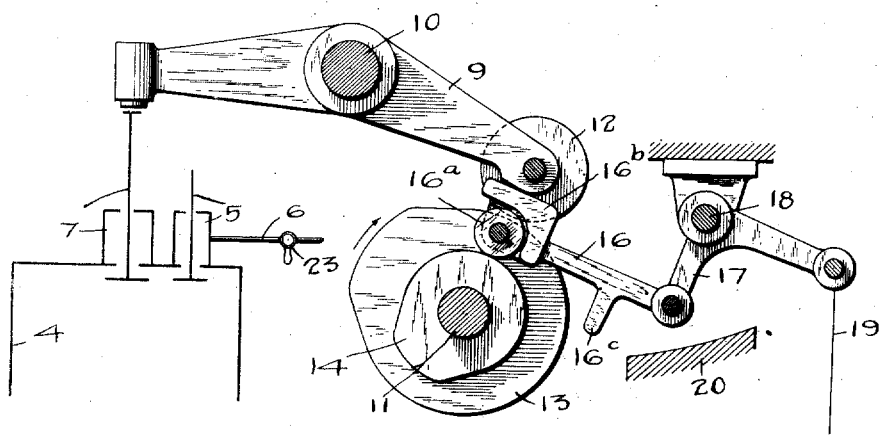
Fig. 7 represents the compression relieving or controlling member in a still further extreme position of control.

In Figs. 2 to 7, the combustion cylinder is marked 4, and may be assumed to represent one or several cylinders of any type of combustion engine, but more especially an engine of the constant pressure type such as the Diesel engine. Numeral 5 represents the starting-air port and valve which controls the admission of starting air to such cylinder or cylinders from any suitable source of compressed air, represented by an air pipe 6; and numeral 7 represents a port and valve by which some or part of the air so admitted may be exhausted so as to relieve and hence control the degree of compression taking place in the cylinder on the return stroke of the piston. This port and valve may be either the normal exhaust valve, or the air admission valve of a 4-cycle engine, or the scavenging port of a 2-cycle engine, or an independent valve, being herein termed the compression-relieving or exhaust valve because of its function just stated. The operation of these valves may be caused by any suitable type of valve-actuating mechanism adapted to operate them in proper phase with the motion of the piston and other parts, but they are preferably actuated as in the case illustrated, by the regular valve-gear system of the engine, through which the engine as a whole is normally operated when running under the combustion process. Such gear system may therefore comprise a valve lever 8 for the starting valve 5, and a lever 9 for the exhaust valve 7, both mounted to rock on a common fulcrum shaft 10, or other suitable support, and arranged to be actuated by cams on a cam shaft 11, revolving for example in the direction of the arrows. It will be understood that shafts 10 and 11 may be common to all of the cylinders of the engine and may be provided with duplicates of the levers 8 and 9, for each of the other cylinders, as well as with other levers and cam or eccentric operated connections for controlling other functions, according to the type or cycle of the particular engine with which the invention is used. It will also be understood, by those skilled in this art, that the cams may act either immediately on the valve levers, or through connections interposed for changing the speed or direction of the engine, or for other purposes. In the present case, the exhaust valve lever 9, is supplied with a friction roller 12, which is engaged during normal running with the cam 13; when the valve 7 is the normal exhaust valve the cam 13 is a normal exhaust cam. Adjacent to this exhaust cam, the cam-shaft carries an auxiliary cam 14, which may engage and lift a thrust element, which can be interposed between it and the end of the valve lever for actuating the latter. This thrust element is formed by the end of a link 16 pivoted to the crank arm 17 of a rock shaft 18, the latter being suitably supported and adapted for operation by any suitable form of handle or connecting rod 19, so that the thrust-element can be moved from its retracted position indicated in Fig. 6, in which it is not operated by its cam, to positions such as indicated in Figs. 4 and 7, wherein it receives more or less of the thrust of such cam, imparting the same to the valve lever and through it to the exhaust valve 7, thereby causing either earlier or later closing of such valve or a greater or less extent of such opening. The cam 14 is designed to actuate or control the thrust element 16, at or during the period corresponding to the beginning of the normal compression stroke of the engine piston and when acting upon the valve through the thrust element serves to vent, more or less, the contents of the cylinder at such time, according to the position of the thrust element 16, and thereby controls the degree of compression in the cylinder. Such thrust element may be provided with a friction roller 16ᵃ to engage the cam and a flat striking face 16ᵇ, by which to engage the lever; it is also provided with a supporting leg 16ᶜ by which it may rest on a suitable support 20, when retracted. This leg may be adjustable in length and the support therefor may be shaped to guide the element into its active position between the cam and lever.

The starting valve lever 8 is actuated by a cam 21, through a thrust element 22, which may be of similar design and construction to the element 16 above referred to, and pivoted to a crank arm 23 of the same rock shaft 18, and also provided with a similar leg upon which to rest on a guiding support such as 20. The rock shaft 18, it will be understood may be common to the thrust elements of all the cylinders of the engine, representing a means whereby the same control can be exerted simultaneously upon all of them.

In its retracted position the thrust element 22 (Fig. 5) has no operation on the starting lever 8, nor has the thrust element 16, Fig. 6, any operation upon the compression controlling member, and this is the position in which these elements remain during the normal combustion running of the engine. When element 22 is interposed between its lever and cam, it causes the opening of the starting valve, producing a greater or less admission of starting air, in accordance with the extent to which such element is advanced from its retracted position, into its interposed position.

Figs. 3 and 4 may represent the positions of the two thrust elements when the engine is being operated by compressed air for starting it in motion, or other purposes. The air admitted through the port 5 and producing the working stroke of the engine piston, is exhausted after expansion and during the following stroke by reason of the open position of the exhaust port 7 due to the action of the cam 14 and thrust element 16. The cycle thus corresponds to diagram A, above referred to. As the engine gains acceleration under the starting-air, the thrust elements are retracted toward the supporting shelf 20 and thereby the degree of starting air admission is reduced and simultaneously the degree of exhaust is also reduced, so that the compression is increased, according to the cycle represented by the diagram B. When sufficient velocity of the engine has been attained the elements are entirely removed from their interposed relation and the starting air will then have been discontinued entirely and normal compression will have been resumed, at which time the cylinder temperature will be sufficient to insure reliable ignition of the fuel when introduced. In Diesel type engines the residue of starting-air thus compressed in the cylinder will have sufficient temperature to produce ignition of the fuel on injection.

According to this invention, the control mechanism above described is adapted to serve the further function of a compression release when the engine is brought to rest after a period of combustion running, or when the engine is to be turned by hand or otherwise for inspection purposes, or to put them in a starting position. For this purpose the control member 19 can be moved to its extreme limit of downward movement, as indicated in Fig. 7, so as to shove the thrust element 16 to its extreme position between the valve lever and cam 14, thereby holding the exhaust valve open during the whole cycle period. During normal running of course the supply of starting air will be shut off by having previously closed a supply cock at the air bottle, or such as shown at 23, so that such extreme movement of the control mechanism and possibly the consequent opening of the starting valve, will result in no motive effect upon any piston of the engine. This feature while incidental to the principle of my invention, will be observed to be also capable of use independently thereof, the described arrangement of thrust members in the form of links which are advanced endwise into position to relieve the compression, being especially simple and convenient.

It will be observed from the foregoing that while the control mechanism relates principally to the starting and stopping of the engine, the same handle or connecting rod, such as 19, may also, by its movement beyond that required for starting, serve to control the normal running functions of the engine, that is to say, such member may control the amount, or the time, of fuel injection in a constant pressure engine, so that the entire control of the engine can be represented by a single lever, hand-wheel, or the like. It will also be observed that the functions above described are capable of being carried out in a variety of different ways within the scope of the invention and that there is no intentional limitation herein to the specific form or location of valves nor to the construction of any of the parts except as pointed out in the claims hereto.

I claim,

1. Air-starting gear for combustion engines comprising the combination with the engine cylinder and piston of a valve in control of the cylinder compression, a valve for admitting starting-air to the cylinder, and controlling means adapted for simultaneously and inversely varying the degree of compression and admission of starting-air.

2. Air-starting gear for combustion engines comprising in combination with the cylinder, piston and a source of compressed air, of inlet and exhaust ports for leading such air to and from the combustion cylinder, suitable gearing for controlling such ports in phase with the motion of the piston, and means for simultaneously decreasing the degree of the admission and exhaust through such ports.

3. Starting gear for combustion engines comprising in combination with the engine cylinder or cylinders and a source of compressed air, of inlet and exhaust valves to lead such air to and exhaust it from the combustion cylinder or cylinders, an engine-driven cam system for operating said valves and means for variably affecting such operation to decrease the degree of air admission and exhaust, whereby compression may be restored as the admission is diminished.

4. Air-starting gear for combustion engines comprising the combination of the normal valve-operating mechanism of the engine and valves operated thereby including a valve for admitting starting-air and a valve suitable for relieving the cylinder compression, and means interposable between such valves and valve-operating mechanism for varying the degree of admission of starting air inversely to the degree of compression.

5. In air-starting gear for combustion engines, the combination of the normal valve-operating system of the engine and the valves operated thereby, including a starting valve, and a compression-controlling valve, and means for decreasing the admission of starting air while increasing the compression, comprising normally retracted mechanism adapted to be variably advanced into coöperation with said valve-operating system.

6. In air-starting gear for combustion engines, the combination with the engine cylinder and piston, of a starting-valve, and means for actuating the same in phase with the piston, a compression-controlling device, and means for controlling such device in such manner as to restore compression gradually to the cylinder, at the same time varying the actuation of the said starting-valve by its said actuating means so as gradually to reduce the admission of starting air.

7. In air starting gear for combustion engines, the combination with the cylinders and pistons thereof, of air admission and exhaust valves operated in phase with the pistons to start the engine in motion, and controlling means for such valves normally operable to vary the throw thereof and having an extreme adjustment for relieving the cylinder compression independently of the position of the engine parts.

8. In air-starting gear for combustion engines, the combination of starting air admission and exhaust ports, means for operating the same in phase with the engine, and means for varying the open periods of such respective ports, such means having an extreme position in which it relieves the cylinder compression.

9. The combination with the exhaust valve of an internal combustion engine, of a cam for operating the same, a member adapted to be inserted between the cam and valve to relieve the engine compression, and means for operating said member, the relation between the cam, valve and member being such that the compression may be relieved throughout the cycle of operations or only during a portion of the compression stroke, at will, according to the position to which the member is moved by its operating means.

10. A compression relief for internal combustion engines, comprising in combination, a valve and a cam adapted to operate it, and a pivotally mounted link member adapted to be advanced in a substantially endwise direction between the valve and cam of such size and range of movement as to open said valve independently of the position of the other engine parts.

In testimony whereof, I have signed this specification in the presence of two witnesses.

ALFRED BÜCHI.

Witnesses:
H. DIEBOLOH,
AUGUST RUIGG.